May 17, 1960
R. T. WALLACE
2,936,920
MOLDED ARTICLES HAVING MOLDING SEAMS OR THE
LIKE FORMED ON THE BASE THEREOF
Filed May 3, 1957
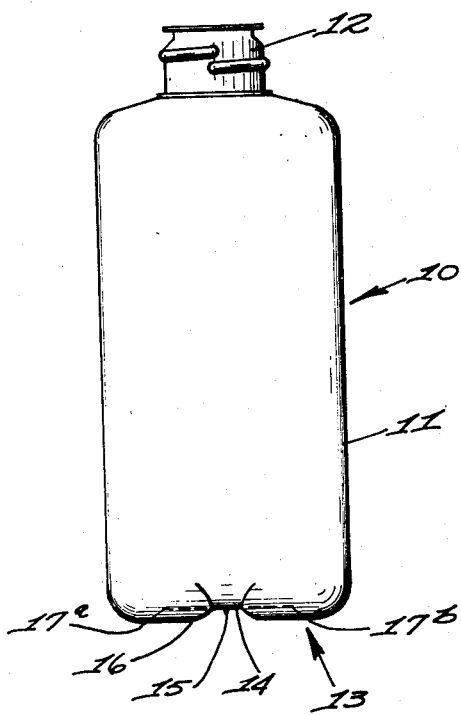
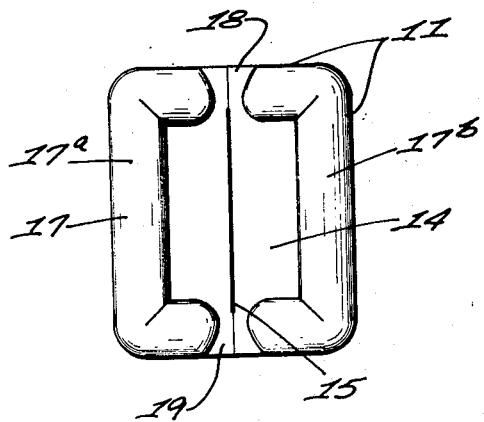
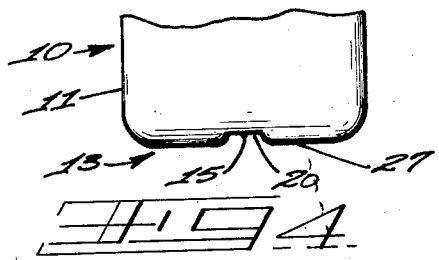
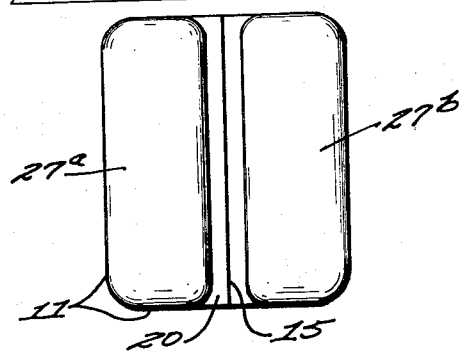
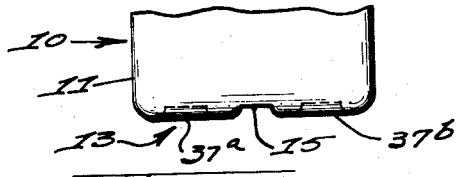
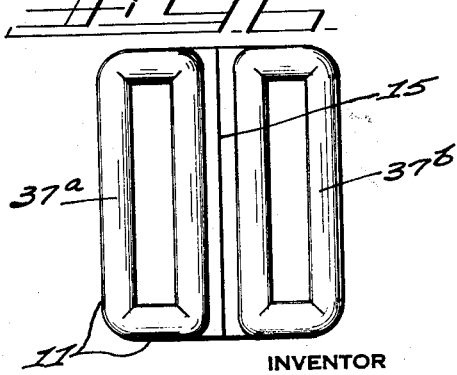
INVENTOR
Robert T. Wallace
BY W. A. Schaich &
Leonard D. Soubner
ATTORNEYS

United States Patent Office 2,936,920
Patented May 17, 1960

2,936,920

MOLDED ARTICLES HAVING MOLDING SEAMS OR THE LIKE FORMED ON THE BASE THEREOF

Robert T. Wallace, Toledo, Ohio, assignor to Owens-Illinois Glass Company, a corporation of Ohio Application May 3, 1957, Serial No. 656,843

5 Claims. (Cl. 215—1)

This invention relates to improvements in the bottom surface or base structure of articles of the type having molding seams, flash, or fins, or the like formed thereon.

In the molding of various articles, and particularly glass or plastic containers, for example, the final molded product is oftentimes characterized by the inclusion of molding seams, flash, or fins, as they are sometimes called, formed on the exterior surface of the article. When such molding seams, as they will hereinafter be referred to, occur on the bottom surface or base of such articles, they frequently interfere with the stability thereof by preventing the article when placed in an upright position from resting squarely or uniformly upon such bottom surface. Consequently, the container tends to tilt or rock upon the molding seam and is rendered quite susceptible to being easily upset, if not entirely prevented from being placed in a balanced, upright position.

Although in the case of plastic containers is is possible to remove these molding seams by severing or tumbling procedures well known in the art, such removal is both time consuming and costly and, hence, quite undesirable due to the established low cost and competitive nature of such items.

The invention in its preferred embodiment will be hereinafter described with respect to molded containers; however, it is well understood that the invention is, in its broad aspect, equally applicable to various other types of molded articles characterized by the inclusion of molding seams or the like, formed on the base thereof.

Accordingly, one object of the present invention is to provide an article having a bottom surface or base upon which the article may be supported, and which obviates the above disadvantages occurring from the formation of a molding seam or the like formed thereon, by providing said base with a bearing surface upon which the article may be rested in balanced, upright position without requiring removal of said molding seam.

It is also desirable that molded articles such as containers should be adapted to conform readily to existing types of equipment designed to handle the containers in subsequent processing operations. For example, when the containers are subsequently introduced into the filling operations wherein they are filled with their intended contents, they are frequently transferred from one piece of equipment to another by sliding the containers, while in an upright position, along their bottom surface or base. Hence, to facilitate such sliding movement, it is desirable that the bottom surface or base of the containers be shaped so as to promote such sliding movement and, at the same time, not tend to catch upon the equipment or other rough surfaces over which they slide. Hence, it is another object of this invention to provide a container having a bottom surface or base which will facilitate such upright sliding movement.

A further object of this invention is to provide an article having a base with the aforedescribed improved characteristics, and which is further characterized by a simple design capable of being readily molded on a production basis by conventional molding techniques.

The specific nature of this invention, as well as other objects and advantages thereof, will become apparent to those skilled in the art from the following detailed description, taken in conjunction with the annexed sheet of drawings on which, by way of example only, the preferred embodiments of this invention are illustrated.

On the accompanying drawings:

Fig. 1 is a side elevational view of a molded container in which one preferred form of the present invention is embodied.

Fig. 2 is a bottom view of the container illustrated in Fig. 1.

Figs. 3–6 illustrate modifications of the present invention.

With reference to the drawings, there is illustrated in Figs. 1 and 2, a container 10 which may be of molded construction and fabricated from glass, plastic, metallic, or other like materials. Although the container illustrated defines a rectangular configuration, it is well understood that such configuration may be circular, triangular, or otherwise shaped. The container includes planar side walls 11 which merge with a threaded neck portion 12 formed on the upper end of the container, and with a base 13 formed on the bottom of the container.

The base 13 of the container comprises a relatively flat center portion 14 upon which there is formed an integral protruding fin or flash of material in the form of a molding seam 15, which extends across the center portion of the base and terminates adjacent to opposite edges thereof. Also included as an integral part of the base, there is a marginal depending rib 16 which is raised relative to the center portion 14 and which defines an outermost bearing surface 17 on which the container is supported in balanced, upright position.

To prevent the molding seam 15 from interfering with the balanced support intended, the bearing surface 17 is separated into C-shaped segments 17a and 17b, the separations occurring at locations 18 and 19, situated in the path of the molding seam. The extent to which the bearing surface 17 is raised relative to the center portion 14 of the base depends upon the height of the molding seam 15 and, obviously, will vary according to the procedure followed in forming the article. However, the relative height of the bearing surface 17 should be such that the molding seam 15 will not protrude outwardly beyond the bearing surface and, although the bearing surface is illustrated as being raised considerably higher than the molding seam, it is understood that it need be raised only at least as high as the molding seam in order to provide the desired balanced support to the container.

To facilitate sliding movement of the container while in an upright position and without upsetting same, the bearing surface is shaped to define a smooth and substantially continuous surface, As indicated previously, this feature is very important, since it facilitates sliding upright movement of the container during subsequent filling operations.

In Figs. 3 and 4, illustrating a modification of the present invention, the base 13 is formed with an enlarged segmental bearing surface shaped to extend over a much greater portion of the base. In this modification, the depending segmental rib 27 defines a pair of raised bearing surfaces 27a and 27b, which extend inwardly from the edge of the base to a location adjacent to opposite sides of the molding seam 15 and define a narrow channel 20, extending along and accommodating the molding seam throughout its entire length.

In Figs. 5 and 6, another modification of this invention is illustrated, wherein each of the bearing surface segments 37a and 37b is generally of annular configuration. The segments 37a and 37b are spaced on opposite sides of the molding seam 15, and each respectively defines a raised portion extending along the edge of the base and adjacently along the length of the molding seam.

The extremely simple and novel structure of the bearing surface, as herein set forth, eliminates the problem of upright instability of the container caused by the formation of the molding seams, fins, flash, or the like formed on the base thereof and occurring during the molding of the container. Further, this problem is overcome in an expeditious manner and at a minimum of cost, since the necessity of removing such molding seams and the like is obviated. As a further consequence of this invention, such containers, while maintained in an upright position, may be readily handled and repositioned by sliding movement such as is encountered during subsequent processing and filling operations without modification of presently existing equipment utilized in such operations.

It will, of course, be understood that various details of construction may be modified throughout a wide range of equivalents without departing from the principles of this invention, and it is, therefore, not the purpose to limit the patent granted hereon otherwise than as necessitated by the scope of the appended claims.

I claim:

1. A molded container having a base formed with a transverse molding seam thereon terminating adjacent to opposite edges of said base, including the improvement comprising a depending rib formed on the periphery of said base but not traversing said molding seam, said rib being separated into generally C-shaped segments located on opposite sides of said molding seam and terminating adjacent thereto, said segments having rounded bearing surfaces extending the length thereof and spaced from said base a distance not less than the height of said molding seam to thereby provide uniformly distributed upright support to said container.

2. A molded container having a base formed with a protruding molding seam on the exterior surface thereof and terminating on opposite marginal portions of said base, including the improvement comprising a depending rib formed on the periphery of said base but not traversing said molding seam, said rib being separated into similar rectangularly shaped segments disposed on opposite sides of said molding seam and adjacent thereto, said segments defining rounded bearing surfaces extending the length thereof and spaced from said base a distance not less than the height of said molding seam to thereby provide uniformly distributed upright support to said container.

3. A molded container having a base formed with an integral segmental rib extending discontinuously around the margin of said base and depending therefrom, a protruding molding seam extending transversely across said base and coinciding with the discontinuous marginal regions between said rib segments, and said rib segments having rounded bearing surfaces extending the length thereof and spaced from said base a distance not less than the height of said molding seam to thereby provide uniformly distributed upright support to said container.

4. The article as defined in claim 3, wherein said rib segments respectively define a rectangular bearing surface adjacent to opposite sides of said molding seam.

5. The article as defined in claim 3, wherein said rib segments respectively define a discontinuous annular bearing surface segmented adjacent to opposite sides of said molding seam.

References Cited in the file of this patent

UNITED STATES PATENTS

| D. 17,381 | Sterrett | June 7, 1887 |
| D. 163,668 | Yates | June 12, 1951 |
| 97,922 | Houghton | Dec. 14, 1869 |
| 1,451,822 | Hagerty | Apr. 17, 1923 |
| 1,587,167 | Marsdeu | June 1, 1926 |
| 1,737,744 | Wicklein | Dec. 3, 1929 |

OTHER REFERENCES

Modern Laboratory Appliances (Designs and Photostat Div.). Copyright 1942. Fisher Scientific Co. and Eimer and amend. pages 379 and 383.